June 22, 1954    W. M. DAVIS    2,681,955
BELT OPERATED BATTERY SWITCH
Filed Sept. 22, 1952
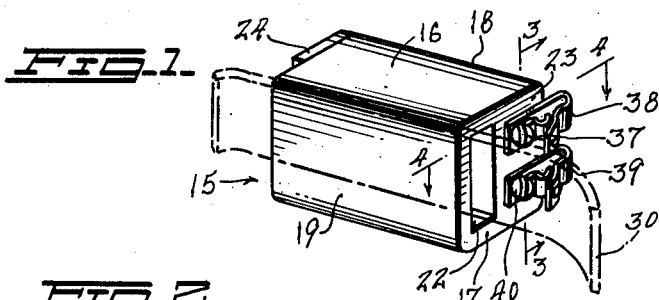
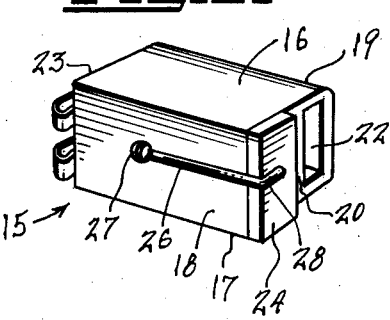
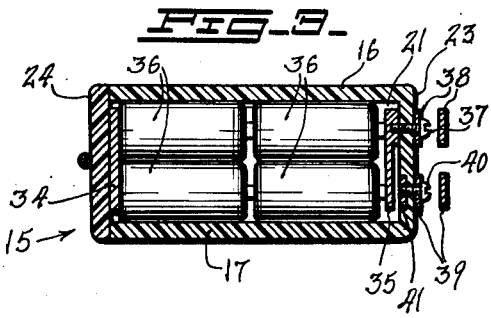
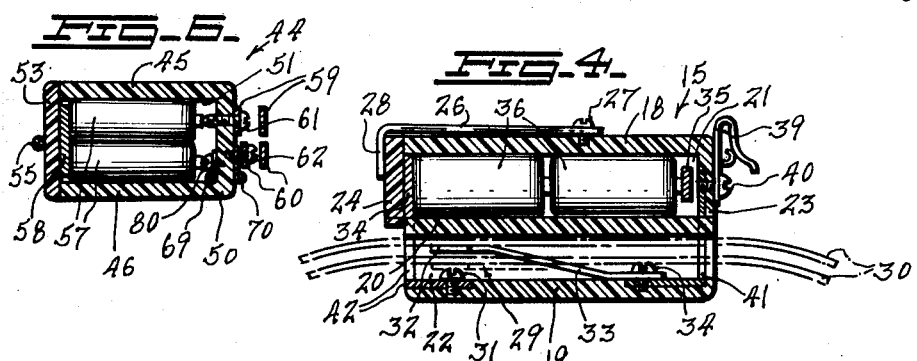
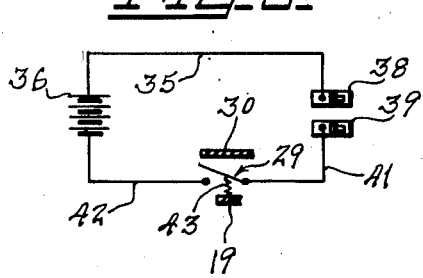
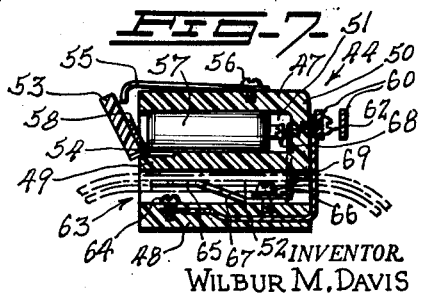
INVENTOR.
WILBUR M. DAVIS
BY
ATTORNEY Patented June 22, 1954

2,681,955

UNITED STATES PATENT OFFICE 2,681,955

BELT OPERATED BATTERY SWITCH

Wilbur M. Davis, Brooklyn, N. Y.

Application September 22, 1952, Serial No. 310,804

4 Claims. (Cl. 200—52)

This invention relates to new and useful improvements in battery switches.

More particularly, the present invention proposes the construction of a battery switch which can be carried on the belt of a person and which can be operated without the use of hands simply by the wearer tightening his belt by extending his stomach muscles.

Another object of the present invention proposes forming a belt operated battery switch which will permit free use of a person's hands and yet which can be closed as desired to complete a battery circuit and supply electrical current for any battery operated tool or device such as warning lights, torches, motor driven hand tools, illuminating lapel buttons, studs, necktie pins, flash bulbs, concealed cameras and the like.

Still further, the present invention proposes arranging the battery switch on a battery holding casing in which a battery or batteries can readily be inserted and securely retained and the entire unit be carried on a belt with conveniently accessible terminals for connecting any article into the battery circuit.

As a further object, the present invention proposes arranging the belt operated battery switch on a battery carrying casing with the entire unit compact and light to carry and inexpensive to manufacture.

The present invention further proposes a novel arrangement of a battery switch having means to bias it normally open and mounted on a casing for carrying on a belt in such open position with the switch disposed adjacent the belt so that it can be closed by belt pressure for use in the many situations where it is undesirable or inconvenient, if not impossible, to operate a battery switch by hand.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a rear perspective view illustrating the belt operated battery switch of the present invention with a belt indicated in dot-dash outline.

Fig. 2 is a front perspective view similar to Fig. 1 but with the belt omitted.

Fig. 3 is a sectional view taken on line 3—3 of Fig. 1.

Fig. 4 is a sectional view taken on line 4—4 of Fig. 1.

Fig. 5 is a schematic wiring diagram.

Fig. 6 is a view similar to Fig. 3 but illustrating a modification of the present invention.

Fig. 7 is a view similar to Fig. 4 but further illustrating the modification of the present invention shown in Fig. 6.

The belt operated battery switch, in accordance with the first form of the invention illustrated in Figs. 1 to 5 inclusive, has a casing 15 made of food, plastic or other insulators or substantially non-conductors.

Casing 15 has a top wall 16, a bottom wall 17 and front and rear walls 18 and 19. A center wall 20 in casing 15 divides the casing into a battery holding compartment 21, located between the front wall 18 and center wall 20, and a belt passageway or passage opening 22, located between center wall 20 and rear wall 19 of the casing. An end wall 23 closes one end of the battery holding compartment 21 and a removable cover 24 is provided for the open end of the battery compartment 21.

A spring clip 26 is secured to the casing by a screw 27 extending into the front wall 18 of the casing. Spring clip 26 removably holds the cover 24 in place, the free end 28 of the spring clip being bent to abut the cover.

A normally open switch 29 is fastened to the casing 15 in the belt passage opening 22 for rearward disposal behind a belt 30 when the belt 30 (indicated in dot-dash outline) is passed through the belt opening 22 for carrying the casing on a belt around a person's body. The switch 29 is adapted for closing by belt pressure against it. Switch 29 has a stationary contact 31 (Figure 4) fixed to the rear wall 19 of casing 15 in the belt passageway 22 and a movable contact 32 with a resilient contact arm 33. One end of the arm 33 is fixed to the rear wall 19 of the casing by screw 34 and the other end of the arm is fastened to movable contact 32 to dispose the movable contact 32 in overhanging position over the stationary switch contact 31. The stationary contact 31 as shown is a metal screw.

The resilient arm 33 as shown is a leaf spring. Resilient arm 33 and movable contact 32 are spaced far enough from the stationary contact 31 to permit passage of belt 30 between the center wall 20 and the arm 33 and movable contact 32 without closing the switch. The solid line position of the switch arm 33 and movable contact 32 in Figure 4 indicates this open condition of the switch when the casing is in normally carrying position on the belt of a person. The dot-dash depressed position of belt 30 and the switch arm 33 and movable contact 32 shows the closed position of the switch by belt pressure when the belt is tightened by its wearer extending his stomach or abdominal muscles.

Positive and negative battery contacts 34 and 35 respectively are provided in the battery holding compartment 21. Batteries 36 fit in the compartment 21 operatively engaging the battery contacts 34 and 35. Contact 34 is secured to the cover 24 of the battery holding compartment, as by cement, and battery contact 35 is secured to the closed end wall 23, as by metallic conductor screw 37.

A pair of spaced terminals or terminal clips 38 and 39, is secured to the end wall 23 of the casing 15, terminal 38 being secured by the conductor screw 37 with which battery contact 35 is connected and terminal 39 being secured by a metallic conductor screw 40.

The conductor screw 37 thus provides means to connect one terminal (terminal 38) with one battery contact (contact 35). The other terminal 39 is connected by conductor screw 40 and metallic conductor strip or conduit 41 with one of the switch contacts, movable contact 32, through the metallic conductor resilient arm 33. The other switch contact, stationary contact 31, is connected by conductor strip or conduit 42 with the other battery contact, contact 34.

In this manner, means is provided selectively to complete a battery circuit when the switch is closed by belt pressure against the movable contact 32 and resilient arm 33 as the belt is tightened in the manner above described. When the resilient arm 33 is a metallic conductor leaf spring, no separate contact portion 32 is necessary. In the wiring diagram of Figure 5, the normally open switch 29 is indicated diagrammatically as a single arm with a separate spring 43 secured to the rear wall 19 of the casing 15.

The modification of the invention shown in Figures 6 and 7 is characterized by the provision of a small casing 44 having top and bottom walls 45 and 46, front and rear walls 47 and 48, center wall 49, end wall 50 and battery holding compartment 51 and belt passageway or passage opening 52, a cover 53 is hinged to the casing 44 by a flexible hinge 54 and removably secured by a spring clamp 55 fastened to the casing by screw 56.

Battery holding compartment 51 is adapted to hold two small batteries 57 such as pen light batteries, side by side.

Cover 53 has a conducting plate 58 secured to it and adapted to abut the adjacent ends of batteries 57 in the battery compartment 51. Two spaced terminals 59 and 60 are secured on the outside of the casing at the closed end 50 of the battery compartment 51 by screws 61 and 62. A normally open switch 63 has a stationary contact 64 in the form of a screw secured to the rear wall 48 of the casing in the belt passageway 52 and a movable leaf spring contact 65 having one end secured to the rear wall 48 by a screw 66.

Screw 66 holds the contact arm 67 of the movable contact 65 to rear wall 48 in passageway 52 with the contact arm 67 resiliently biased against the opposite wall 49 of the belt passage opening 52 to hold the movable contact 65 spaced from the stationary contact 64.

Two spaced battery contacts are provided at the closed end of the battery compartment 51 each disposed to abut a different battery in the compartment. Conductor screw 61 holding terminal 59 to the casing is one of these battery contacts. The other battery contact is a conductor screw 68 secured to the inner side of end wall 50 of the battery compartment.

A wire 69 is secured at one end to the conductor screw 68 and at its other end to the conductor arm 67 by the screw 66 to provide means to connect this battery contact with one of the switch contacts. A similar wire 70 is secured at one end to the terminal 60 by screws 62 and has its other end secured to the stationary contact screw 64.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A belt operated battery switch comprising a casing having a battery holding compartment and a belt passage opening, two spaced terminals secured to the casing, a normally open switch fastened to the casing in the belt passage opening, said casing having a rear wall with the belt passage opening adjacent said wall and the switch secured to the wall and disposed to lie rearwardly of a belt passing through the opening, said switch being adapted for closing by belt pressure against it, positive and negative battery contacts in the battery compartment, means to connect one terminal with one battery contact and means to connect the other terminal and the other battery contact with the switch for completing a battery circuit when the switch is closed by belt pressure against the switch as the belt wearer tightens the belt by extending his stomach muscles.

2. A belt operated battery switch comprising a casing having top and bottom walls and a front and rear wall, a center wall in the casing dividing the casing into a battery holding compartment between the front and center walls and a belt passageway between the center and rear walls, an end wall closing one end of the battery holding compartment and a removable cover for the other end of said compartment, a spring clip secured to the casing removably to hold the cover in place, a normally open switch having a stationary contact fixed to the rear wall of the casing in the belt passageway and a movable contact with a resilient contact arm having one end of the arm fixed to the rear wall of the casing and the other end fixed to the movable contact to dispose the movable contact in overhanging position over the stationary switch contact, said resilient arm and movable contact being spaced from the stationary switch contact to permit passage of a belt between the center wall and the arm and movable contact without closing the switch, positive and negative battery contacts in the battery holding compartment, a pair of spaced terminals secured to the end wall of the casing, means to connect one terminal with one battery contact, means to connect the other terminal with one of the switch contacts and means to connect the other switch contact with the other battery contact selectively to complete a battery circuit when the switch is closed by belt pressure against the movable contact and resilient arm as the belt is tightened by the wearer extending his stomach muscles.

3. A belt operated battery switch comprising a casing having top and bottom walls and a front and rear wall, a center wall in the casing dividing the casing into a battery holding compartment between the front and center walls and a belt passageway between the center and rear walls, an end wall closing one end of the battery holding compartment and a removable cover for the other end of said compartment, a spring clip secured to the casing removably to hold the cover in place, a normally open switch having a stationary contact fixed to the rear wall of the casing in the belt passageway and a movable contact with a resilient contact arm having one end of the arm fixed to the rear wall of the casing and the other end fixed to the movable contact to dispose the movable contact in overhanging position over the stationary switch contact, said resilient arm and movable contact being spaced from the stationary switch contact to permit passage of a belt between the center wall and the arm and movable contact without closing the switch, positive and negative battery contacts in the battery holding compartment, a pair of spaced terminals secured to the end wall of the casing, a conduit extending from one terminal through the end wall of the casing and connected with one battery contact, a second conduit extending from the other terminal and connected with one of the switch contacts, and a third conduit extending from the other switch contact and connected with the other battery contact selectively to complete a battery circuit when the switch is closed by belt pressure against the movable contact and resilient arm as the wearer of a belt extending through the belt passageway tightens his belt by extending his stomach muscles.

4. A belt operated battery switch comprising a casing having a battery holding compartment adapted to hold two batteries side by side and a belt passage opening, said battery compartment having a closed end and an open end, a cover for the open end and means removably to hold the cover over the open end, a conducting plate on the cover adapted to abut adjacent ends of batteries in the battery compartment, two spaced terminals secured to the casing, a normally open switch having a stationary contact and a movable contact with a contact arm secured to the rear wall of the belt passage opening and resiliently biased against the opposite wall of the belt passage opening to hold the movable contact spaced from the stationary contact, two spaced battery contacts at the closed end of the battery compartment each disposed to abut a different battery in the compartment, means to connect one terminal with one battery contact, means to connect the other terminal with one of the switch contacts and means to connect the other switch contact with the other battery contact.

References Cited in the file of this patent

UNITED STATES PATENTS

| Number | Name | Date |
|---|---|---|
| 1,693,734 | Waggoner | Dec. 4, 1928 |
| 2,135,476 | Rugh | Nov. 1, 1938 |